July 17, 1923.

C. MITCHELL

RAILWAY CAR WHEEL CLAMP

Filed July 25, 1921

Inventor:
Charles Mitchell
BY
S. E. Thomas
Atty

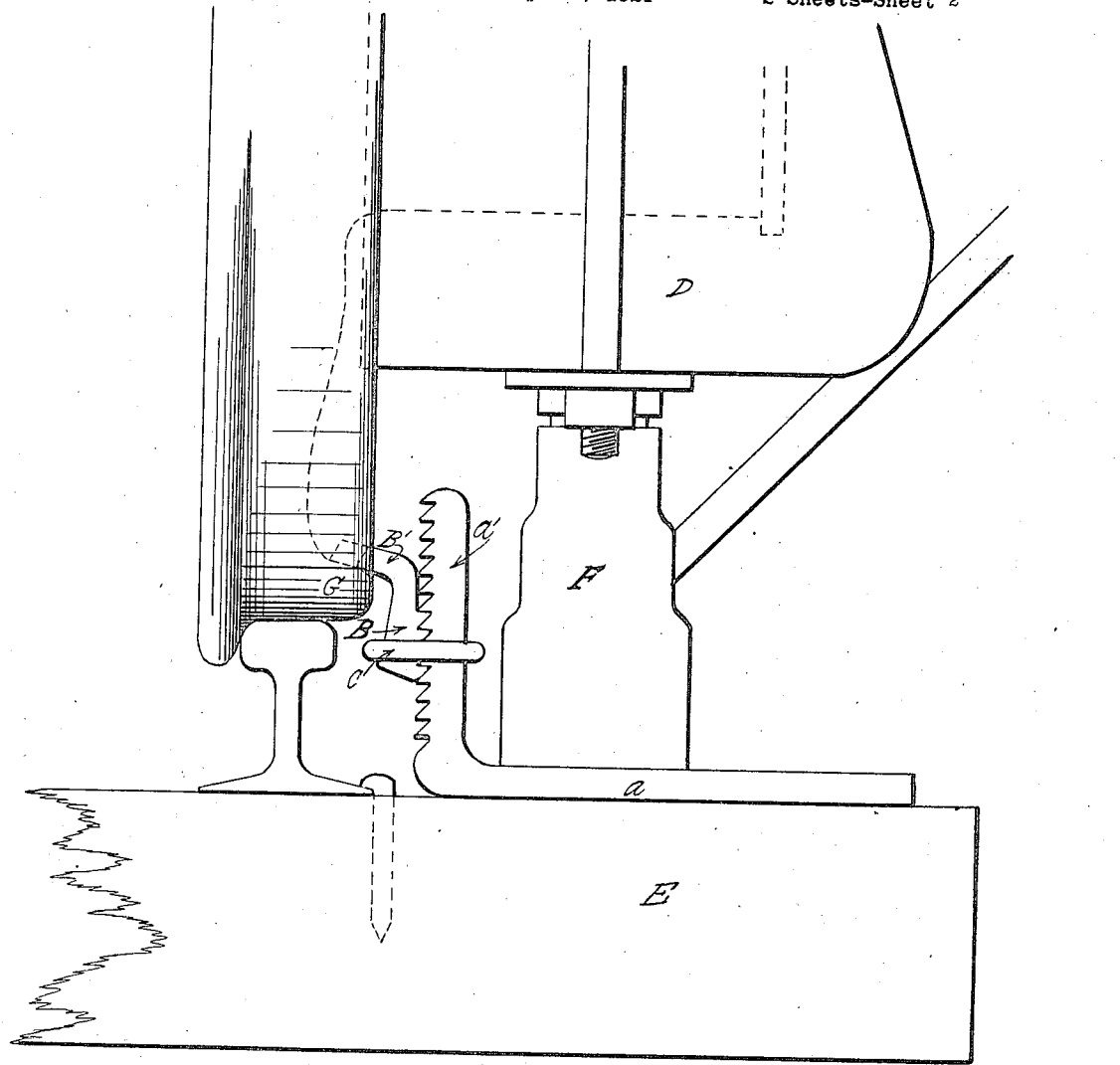

Patented July 17, 1923.

1,462,294

UNITED STATES PATENT OFFICE.

CHARLES MITCHELL, OF WOODSTOCK, ONTARIO, CANADA.

RAILWAY-CAR-WHEEL CLAMP.

Application filed July 25, 1921. Serial No. 487,531.

*To all whom it may concern:*

Be it known that I, CHARLES MITCHELL, of the city of Woodstock, in the county of Oxford, in the Province of Ontario and Dominion of Canada, having invented a certain new and useful Improvement in Railway-Car-Wheel Clamps, do hereby declare that the following is a full, clear, and exact description of the same.

My invention relates to improvements in the above mentioned machines, the object of the present invention is to improve the construction of that class of devices which are employed for preventing the wheels of cars from rising when the axle boxes are jacked up to permit the journal bearings or brass to be removed when worn or broken, and to provide a simple, inexpensive and efficient device of this character adapted to be employed in connection with an ordinary lifting jack, and capable of firmly engaging the rim of a car wheel, and of effectually preventing the same from rising when the axle box is elevated.

The invention consists in the construction and novel combination and arrangement of parts, hereinafter fully described, illustrated in the accompanying drawings and pointed out in the claims hereunto appended.

In the drawings:

Fig. 6 shows a side elevation of a device constructed in accordance with this invention and shown applied to a car wheel.

Like characters of reference designate corresponding parts in all figures of the drawings.

Figure 4:
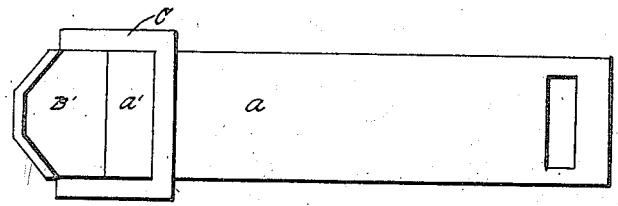
Figs. 2, 3, 4 and 5 are respectively end elevations, and top and bottom plan views of Fig. 1.
Figure 2:
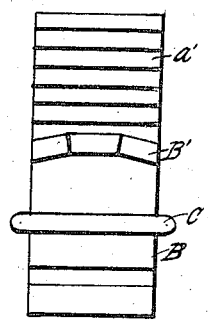
Figure 1:
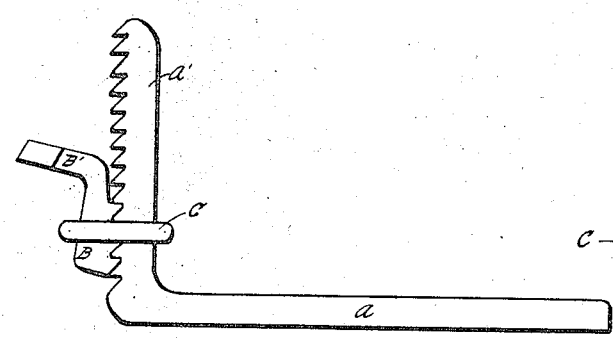
Fig. 1 is a side elevation of my invention with the elements thereof in assembled position.
Figure 3:
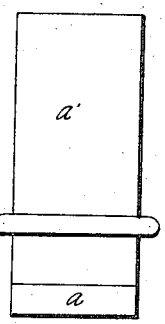
Figure 5:
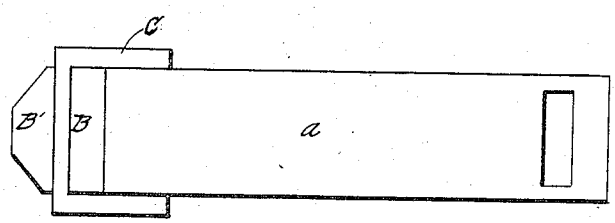

$a$ designates a base plate, from one end of which a vertical standard $a'$ rises, this standard is preferably rectangular in cross-section, and provided with teeth on one side, the teeth being formed with the undersides horizontal. The vertical standard $a'$ receives a car wheel engaging member of substantially the same width as the standard, provided with a vertical part $b$ which engages with the part $a'$ and a substantially horizontal part $b'$ which engages with a car wheel rim.

The wheel clamping member $b$ has formed on the side adjacent the vertical standard $a'$ a series of teeth which engage with the teeth formed on $a'$ and on the side remote from the toothed side it increases in thickness towards the base, forming a wedge shaped part. Projecting at an angle slightly above the horizontal from the upper end of $b$ is the arm $b'$ which extends a suitable distance for the purpose required.

A rectangular ring shaped member $c$ slidably mounted on the vertical standard $a'$ engages with the part $b$ of the clamping member, and due to the wedge shaped part on the side remote from the standard causes the teeth on the clamping member to firmly engage with the teeth on the vertical standard in any pre-determined position of the part $b$ when the ring $c$ is in operative position as shown.

To place the adjustable wheel clamping member $b$ in any desired position, the ring $c$ is raised until it reached the bend where the part $b'$ projects. At this point owing to the decreasing thickness of $b$ there is sufficient room to swing the part $b$ away from the vertical standard, thereby disengaging its teeth from those of the standard. The part $b$ may then be adjusted to any desired height within the range of the device, the teeth engaged, and the ring member forced downward to lock the two parts together.

In the application of the device, the horizontal base plate $a$ is placed at the side of a car beneath the axle box $d$ and upon a cross tie $e$ as shown. The jack $f$ is placed upon the horizontal portion of the base plate and engaged with a part of the truck or journal box, the wheel clamping member $bb'$ is adjusted so that the part $b'$ engages with wheel rim $g$. The car may then be jacked up until the journal bearing or brass is released from the axle, and these parts may be readily removed and renewed.

It will be seen that the device is exceedingly simple and inexpensive in construction, and that it is adapted to be readily employed with an ordinary lifting jack, and that it is capable of firmly gripping and holding a car wheel while the car is being raised to remove the bearing. Furthermore it will be clear that the device is adjustable to engage all kinds of railroad car wheels, having various sized rims or treads.

Having thus described the nature of my invention, and in what manner the same is to be employed, what I claim and desire to secure by Letters Patent is—

In a device of the class described, the combination of a horizontal base part, a vertical standard provided with teeth on its outer face rising from one end of said base, a vertically adjustable, wedge shaped wheel clamping member mounted on said standard and provided with teeth on the side adjacent the standard and co-acting therewith, said upwardly tapered portion presenting an outer inclined surface, a rectangular ring member mounted on the standard and arranged to be engaged by the said inclined face of the clamp to securely hold the same to the standard when in operative position substantially as described.

Woodstock, 16th July, A. D. 1921.

CHAS. MITCHELL.

Signed in the presence of:—
 DUNCAN C. ROSS,
 IRENE B. LEETCH.